United States Patent [19]
Won

[11] Patent Number: 6,040,877
[45] Date of Patent: Mar. 21, 2000

[54] AIR-COOLING APPARATUS FOR A PROJECTION TELEVISION

[75] Inventor: Jong-ho Won, Suwon, Rep. of Korea

[73] Assignee: Samsung Electronics Co., Ltd., Kyungki-do, Rep. of Korea

[21] Appl. No.: 09/066,873

[22] Filed: Apr. 28, 1998

[30] Foreign Application Priority Data

May 9, 1997 [KR] Rep. of Korea ............ 97-17756

[51] Int. Cl.⁷ .................................................. H04N 5/74
[52] U.S. Cl. ........................................ 348/748; 353/61
[58] Field of Search ...................... 348/748, 744, 348/787, 789; 353/74, 61, 60, 57, 52; H04N 5/64, 5/74, 9/31

[56] References Cited

U.S. PATENT DOCUMENTS 2,281,988  5/1942  Osterberg .
4,787,737  11/1988  Ogawa et al. .
5,179,312  1/1993  Vriens et al. .

FOREIGN PATENT DOCUMENTS 5-53200  3/1993  Japan .

*Primary Examiner*—David E. Harvey
*Attorney, Agent, or Firm*—Sughrue, Mion, Zinn, Macpeak & Seas, PLLC

[57] ABSTRACT

An air-cooling apparatus for a projection television is disclosed. The projection television includes a front casing forming an external appearance of a body of the projection television and having a screen installed therein. A rear casing is coupled to the front casing and has a reflection mirror installed therein. A base is integrally formed at a lower portion of the front casing and has an opening and defines a space below the opening. A blowing duct is installed above the opening in the base, and an image projector is installed above the blowing duct and has heat emitting elements including a beam source, dichroic mirrors, a liquid crystal panel and a projection lens therein. A distributing member is disposed within the space and cooperates with the blowing duct so as to distribute air blown by the blowing duct to the heat emitting elements. Thus, according to the present invention, the heat emitting elements disposed in the image projector of the projection television can be concentratedly air-cooled so that the heat emitting elements are prevented from being over-heated. Also, the internal structure of the projection television can be simplified.

5 Claims, 6 Drawing Sheets

AIR-COOLING APPARATUS FOR A PROJECTION TELEVISION

BACKGROUND OF THE INVENTION

1. Field of the Invention

The present invention relates to an air-cooling apparatus for a projection television and, more particularly, to an air-cooling apparatus for a projection television by which heat emitting elements disposed in an image projector of the projection television can be concentratedly air-cooled thereby preventing the heat emitting elements from being over-heated and which can simplify the internal structure of the projection television.

2. Description of the Related Art

Generally, a projection television is an appliance for projecting an image onto a transmission screen. Such a projection television uses cathode ray tubes or a liquid crystal panel.

FIG. 1 shows a schematic sectional view of a projection television using the liquid crystal panel. A body 10 of the projection television consists of a front casing 11, a rear casing 12 and a base 13 which form an external appearance of the projection television. A beam transmission screen 20 is installed in the front casing 11. Installed within the body 10 are an image projector 30 and a reflection mirror 40 for reflecting a beam from the image projector 30 to the screen 20.

FIG. 2 schematically shows a beam path of the image projector 30. The image projector 30 is provided at one side thereof with a beam source 31. A lens 32 for focusing a beam radiated from the beam source 31 is installed at the front of the image projector 30. At one side of the lens 32, there are provided three dichroic mirrors 33 which are inclined and only reflect predetermined colors (red, green, and blue) for obtaining a desired color.

In order to form an image having a length and a breadth in the ratio of 16:9, a liquid crystal panel 34 having a plurality of liquid crystal elements (not shown) therein and a projection lens 35 are disposed at one side of the dichroic mirrors 33. Projection lens 35 radiates a beam, which corresponds to an image formed from the liquid crystal panel 34, toward the reflection mirror 40. Reflection mirror 40 reflects the beam radiated from the projection lens 35 toward the screen 20. In order to form a beam path from the projection lens 35 to the screen 20, the reflection mirror 40 has a predetermined inclined angle and is fixedly installed within the rear casing 12.

In addition, a blowing fan 36 is disposed adjacent to the image projector 30 so as to attempt to dissipate the heat which is generated when the image projector 30 operates and thereby cool the image projector 30.

In the projection television having the above construction, the beam corresponding to the image formed from the liquid crystal panel 34 is radiated through the projection lens 35, and the radiated beam is reflected to a rear side of the screen 20 by the reflection mirror 40, thereby projecting an image onto the screen 20.

At the same time, the blowing fan 36 is driven so that the heat emitting elements, such as the beam source 31, the dichroic mirrors 33, the liquid crystal panel 34 and the projection lens 35, are air-cooled.

However, the conventional projection television having the blowing fan 36 for air-cooling the image projector has a problem. That is, since the blowing fan 36 is simply provided adjacent to the image projector 30, air blown by blowing fan 36 goes past by beam source 31, dichroic mirrors 33, the liquid crystal panel 34 and the projection lens 35, so that the heat emitting elements are not sufficiently air-cooled. Accordingly, the heat emitting elements of the image projector are subjected to an over-heat condition.

In addition, a separated duct is required to be installed in the casing for guiding air blown by the blowing fan, so that not only is the space for installing the duct required, but also the internal structure of the projection television is complicated.

SUMMARY OF THE INVENTION

The present invention has been made to overcome the above-described problem of the related art, and accordingly it is an object of the present invention to provide an air-cooling apparatus for a projection television in which air blown by a blowing fan is distributed into various fluid paths when an image projector is operated, so that heat emitting elements accommodated in the image projector are concentratedly air-cooled, thereby preventing the heat emitting elements from being overheated.

Another object of the present invention is to provide an air-cooling apparatus which is installed at a base of a projection television so that the inner structure of the projection television is simplified.

To achieve the above and other objects of the present invention, there is provided an air-cooling apparatus for a projection television. The projection television comprises a front casing forming an external appearance of a body of the projection television and having a screen installed therein. A rear casing is coupled to the front casing and has a reflection mirror installed therein. A base is integrally formed at a lower portion of the front casing and has an opening and defines a space below the opening. Also, a blowing duct is installed above the opening in the base, and an image projector is installed above the blowing duct and has heat emitting elements including a beam source, dichroic mirrors, a liquid crystal panel and a projection lens therein. An air distributing member is disposed within the space and cooperates with the blowing duct so as to distribute air blown by the blowing duct to the heat emitting elements.

In addition, the blowing duct includes a hollow frame which is disposed above the opening and on which the image projector is installed, a duct which passes through the hollow frame and has a blowing fan therein, and a plurality of exhaust holes formed at an upper portion of the hollow frame, the exhaust holes forming a fluid path together with the duct.

The exhaust holes are disposed adjacent to the heat emitting elements of the image projector and have different sectional areas from each other in proportion to a temperature of each of the heat emitting elements.

Also, the air distributing member includes an air distributing duct installed within the space formed in the base, and an air distributing guide installed in the air distributing duct for distributing the air introduced by the blowing duct into the heat emitting elements of the image projector.

As described above, according to the present invention, heat emitting elements disposed in the image projector of the projection television can be concentratedly air-cooled so that the heat emitting elements are prevented from being overheated. Also, the internal structure of the projection television can be simplified.

BRIEF DESCRIPTION OF THE DRAWINGS

The above object and other advantages of the present invention will become more apparent by describing in detail a preferred embodiment thereof with reference to the accompanying drawings, in which.

DETAILED DESCRIPTION OF THE PREFERRED EMBODIMENT

Hereinafter, a preferred embodiment of the present invention will be described with reference to the accompanying drawings. The elements similar to elements of the conventional projection television have the same reference numbers.

Figure 1:
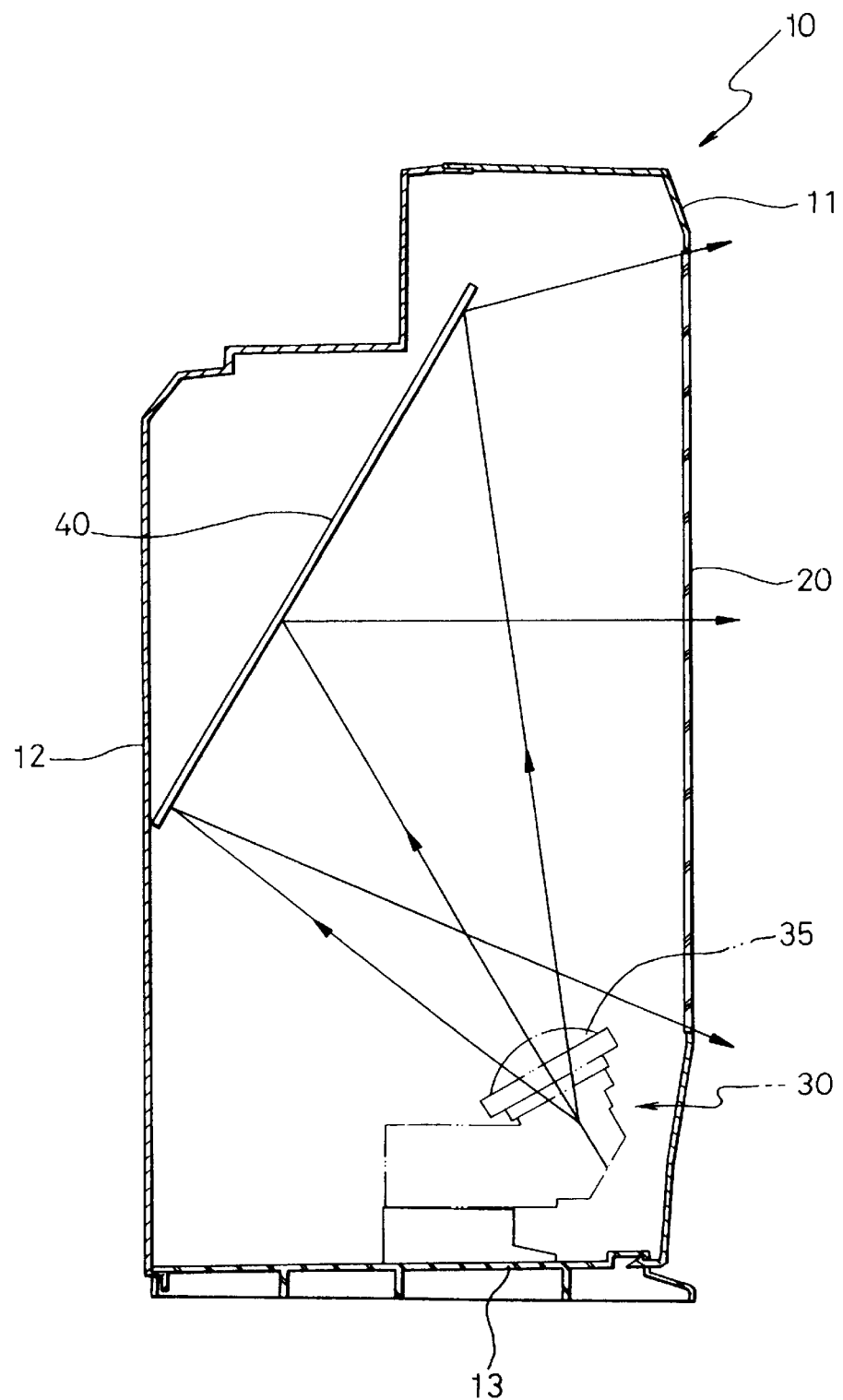
FIG. 1 is a sectional view showing an internal structure of a conventional projection television.
Figure 2:
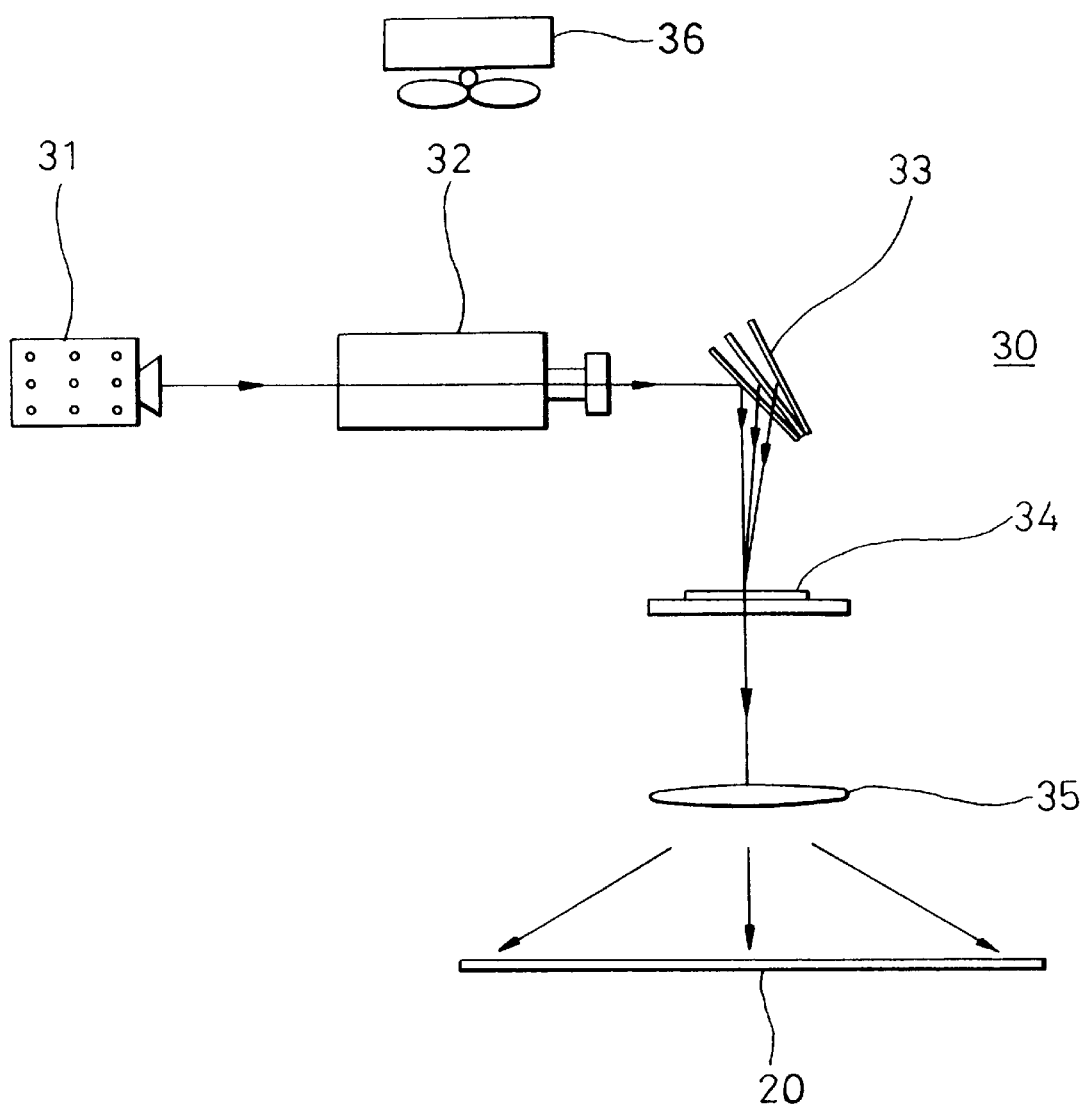
FIG. 2 is a sectional view schematically showing a beam path of a conventional projection television.
Figure 3:
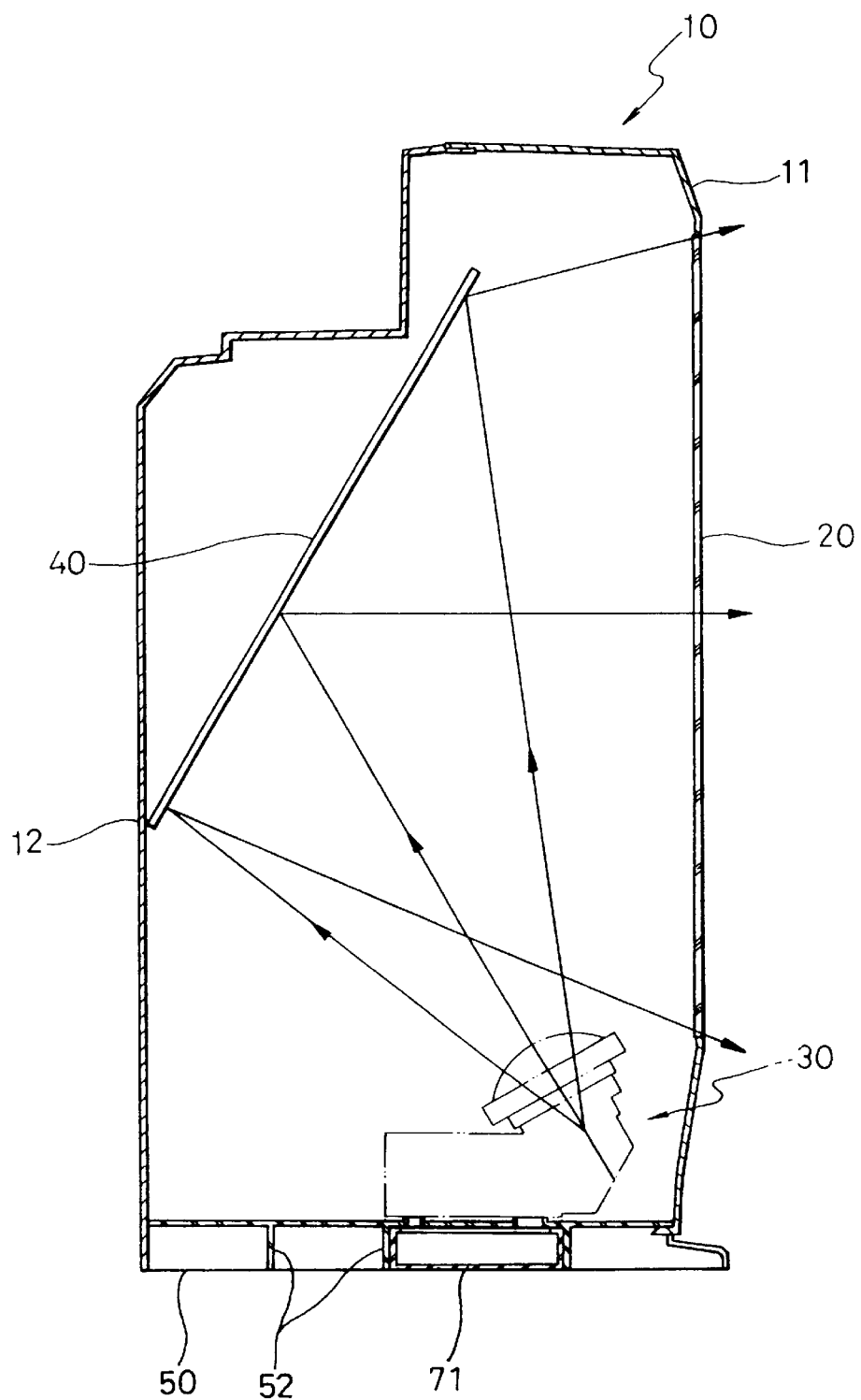
FIG. 3 is a sectional view showing an internal structure of a projection television according to the present invention.

FIG. 3 is a sectional view showing an internal structure of a projection television according to the present invention.

As shown in FIG. 3, the projection television according to the present invention has a body including a front casing 11 and a rear casing 12. A screen 20 is provided in the front casing 11 and a reflection mirror 40 is fixedly installed within the rear casing 12. The front casing 11 is integrally formed at its lower portion with a base 50 having an opening 51 (see FIG. 4). A plurality of ribs 52, which forms a space and supports the body 10, is provided at a lower portion of base 50.

Figure 4:
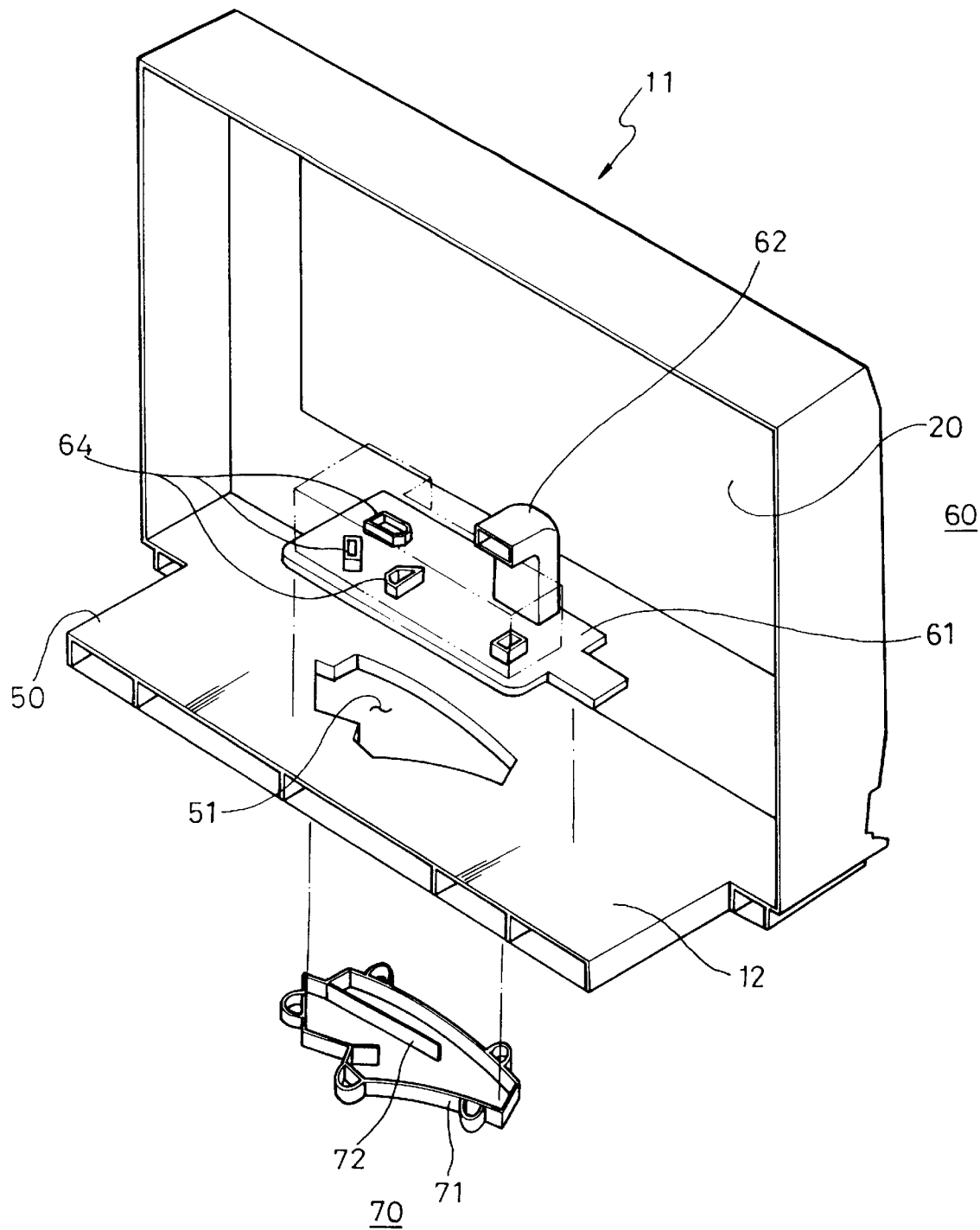
FIG. 4 is an exploded perspective view showing an air-cooling apparatus for an image projector according to the present invention.

FIG. 4 illustrates an air-cooling apparatus for an image projector according to the present invention. As shown in FIG. 4, a blowing duct 60, on which an image projector 30 is laid, is installed on base 50, and an air distributing member 70 for distributing air guided through blowing duct 60 into various elements is disposed within a space formed in the base 50.

Figure 5:
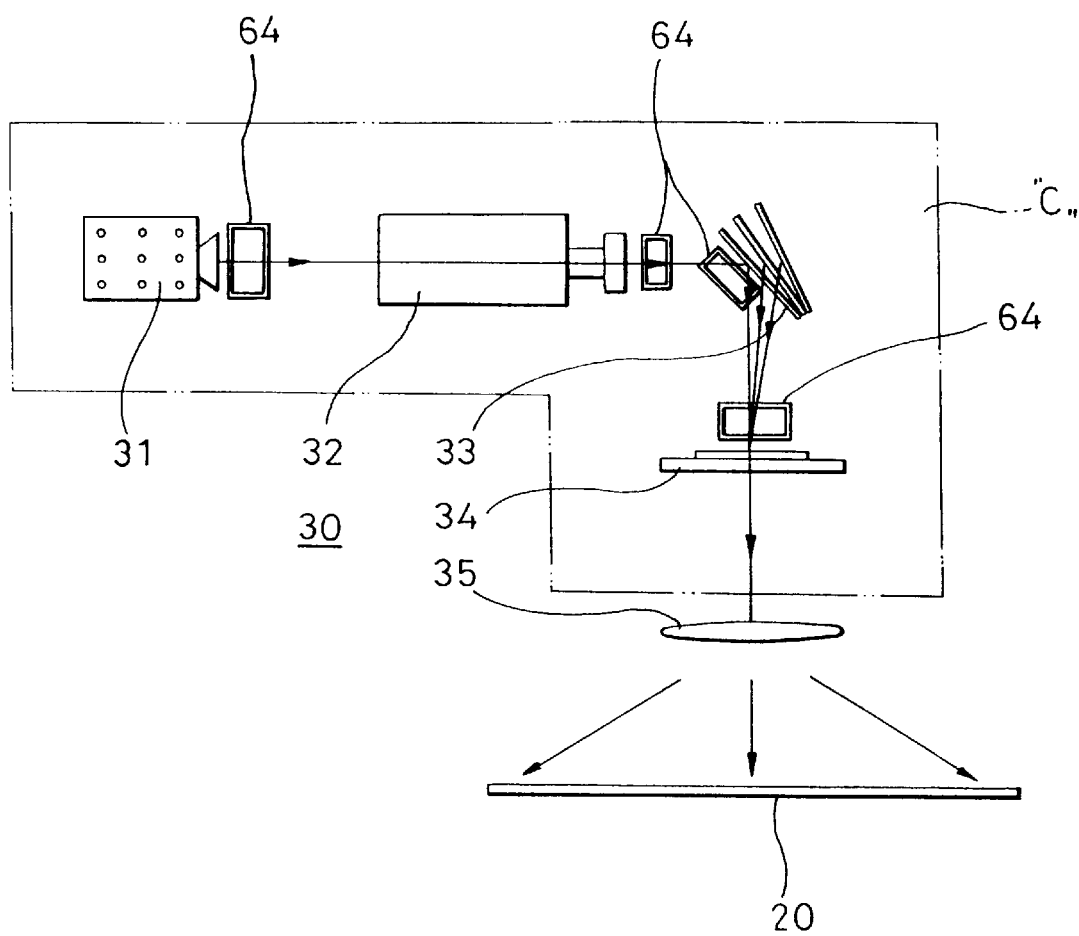
FIG. 5 is a schematic view showing an image projector and a beam path according to the present invention.
Figure 6:
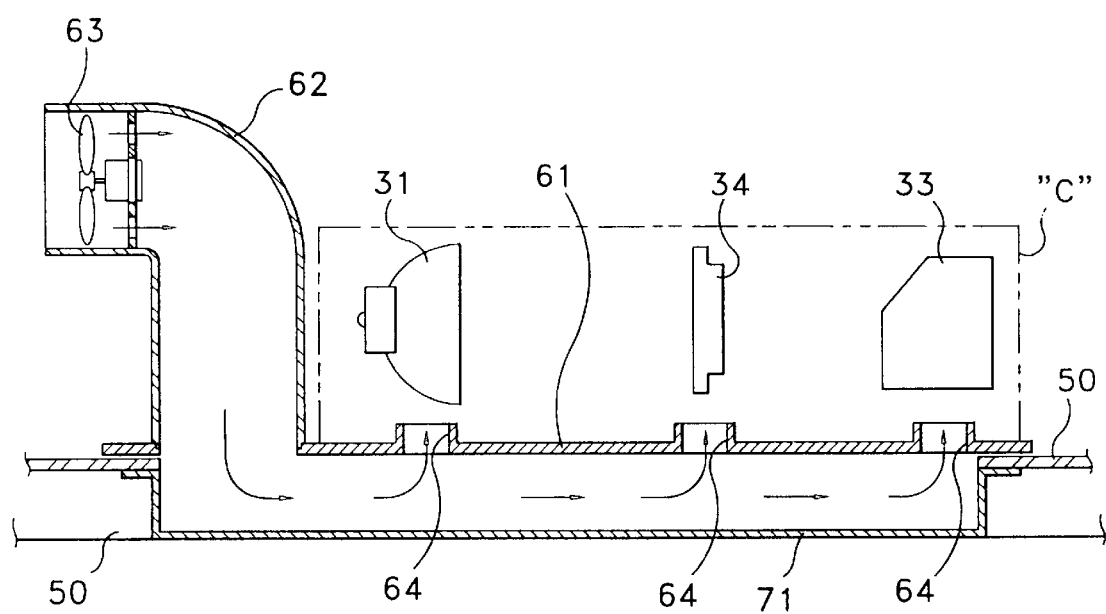
FIG. 6 is a sectional view showing an air flow guided by an air distributing device according to the present invention.

Image projector 30, as shown in FIGS. 5 and 6, comprises a beam source 31, a lens 32, three dichroic mirrors 33, a liquid crystal panel 34 having a plurality of liquid crystal elements (not shown) therein and a projection lens 35. In order to form an image having a length and a breadth in the ratio of 16:9, the liquid crystal panel 34 and the projection lens 35 are disposed at one side of the dichroic mirrors 33. Those elements have the structure identical to the structure of the elements used in the conventional projection television.

Blowing duct 60 is formed above the opening 51 and has a hollow frame 61 on which the image projector 30 is installed. Provided at one side of the hollow frame 61 is a duct 62 having a blowing fan 63 disposed therein. The frame 61 is provided at the other side thereof with a plurality of exhaust holes 64 which form a fluid path together with the duct 62.

Preferably, the exhaust holes 64 are disposed adjacent to heat emitting elements of the image projector 30.

More preferably, exhaust holes 64 are manufactured to have different sectional areas from each other in proportion to the temperature of each of the heat emitting elements.

The air distributing member 70 has an air distributing duct 71 installed within the space below opening 51. The air distributing duct 71 is provided with an air distributing guide 72 which distributes air introduced by the blowing duct 60 into heat emitting elements installed in image projector 30.

Hereinafter, the operation of the present invention will be explained.

A beam corresponding to an image formed from the liquid crystal panel 34 is radiated from the projection lens 35. The radiated beam is reflected toward a rear side of the screen 20 by the reflection mirror 40, thereby projecting an image onto screen 20 as usual.

At the same time, the heat emitting elements of the image projector 30, such as the beam source 31, the dichroic mirrors 33, the liquid crystal panel 34 and the projection lens 35 generate heat.

When the image projector 30 operates, the blowing fan 63 is simultaneously driven thereby blowing air. Air blown by the blowing fan 63 is exhausted through the duct 62 and the fluid path formed by the air distributing duct 71 and the frame 61, thereby air-cooling the heat emitting elements.

In detail, air introduced into the air distributing duct 71 through the duct 62 is distributed by means of the air distributing guide 72 installed in the air distributing duct 71, and then, is exhausted out of the blowing duct 60 through the exhaust holes 64 formed in the frame 61 while cooling the heat emitting elements of the image projector 30.

Accordingly, the heat emitting elements of the image projector 30, such as the beam source 31, the dichroic mirrors 33, the liquid crystal panel 34 and the projection lens 35 are concentratedly air-cooled, thereby improving cooling efficiency.

In addition, since the air distributing duct 71 of the air distributing member 70 is installed in the space formed in the base 50 by the ribs 52, a separate space for installing the air distributing duct 71 is not required.

Heat emitting elements of the image projector 30 can be closed by a casing C which is shown in FIGS. 4 to 6 by a phantom line. Otherwise, the heat emitting elements can be exposed on the frame.

Though the present invention is described with reference to a projection television using a liquid crystal, the present invention is applicable to a projection television using a cathode ray tube, and a projection television using a laser.

In addition, though the present invention is described to have a single blowing fan and a duct, it is possible to provide a separate duct having a separate exhaust fan for exhausting air out to the exterior.

As described above, according to the present invention, heat emitting elements disposed in the image projector of the projection television can be concentratedly air-cooled so that the heat emitting elements are prevented from being overheated. According to the present invention, the internal structure of the projection television can therefore be simplified.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A projection television comprising:
   a front casing forming an external appearance of a body of said projection television, said front casing having a screen installed therein;
   a rear casing coupled to said front casing, said rear casing having a reflection mirror installed therein;

a base integrally formed at a lower portion of said front casing, said base having an opening and defining a space below the opening;

an image projector having heat emitting elements including a beam source, dichroic mirrors, a liquid crystal panel and a projection lens therein; and an air-cooling apparatus which includes:

a blowing duct installed above the opening in said base, said image projector being installed above said blowing duct; and an air distributing member disposed within the space and cooperating with said blowing duct so as to distribute air blown by said blowing duct to the heat emitting elements of said image projector, thereby to cool the heat emitting elements.

2. The projection television as claimed in claim 1, wherein said blowing duct includes a hollow frame which is disposed above the opening in said base and on which said image projector is installed, a duct which passes through said hollow frame and has a blowing fan therein, and a plurality of exhaust holes formed at an upper portion of said hollow frame, the exhaust holes forming a fluid path together with said duct.

3. The projection television as claimed in claim 2, wherein the exhaust holes are disposed adjacent to said heat emitting elements of said image projector.

4. The projection television as claimed in claim 3, wherein the exhaust holes have different sectional areas from each other in proportion to a temperature of each of said heat emitting elements.

5. The projection television as claimed in claim 1, wherein said air distributing member includes an air distributing duct installed within the space, and an air distributing guide installed in said air distributing duct for distributing the air introduced by said blowing duct into the heat emitting elements of said image projector.

* * * * *